United States Patent
Wang et al.

(10) Patent No.: US 11,265,951 B2
(45) Date of Patent: Mar. 1, 2022

(54) METHOD AND APPARATUS FOR RECOVERING RRC CONNECTION, AND TERMINAL

(71) Applicant: GUANGDONG OPPO MOBILE TELECOMMUNICATIONS CORP., LTD., Guangdong (CN)

(72) Inventors: Shukun Wang, Guangdong (CN); Ning Yang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/167,505

(22) Filed: Feb. 4, 2021

(65) Prior Publication Data
US 2021/0160948 A1    May 27, 2021

Related U.S. Application Data

(63) Continuation of application No. PCT/CN2018/100709, filed on Aug. 15, 2018.

(51) Int. Cl.
*H04W 76/27* (2018.01)
*H04W 76/19* (2018.01)
(Continued)

(52) U.S. Cl.
CPC ............ *H04W 76/19* (2018.02); *H04W 12/06* (2013.01); *H04W 68/005* (2013.01); *H04W 76/11* (2018.02); *H04W 76/27* (2018.02)

(58) Field of Classification Search
CPC ..... H04W 76/10; H04W 76/11; H04W 76/19; H04W 76/22; H04W 76/23; H04W 76/25;
(Continued)

(56) References Cited

U.S. PATENT DOCUMENTS

| 10,986,689 B2* | 4/2021 | Rayavarapu | ......... H04W 76/28 |
| 2014/0016614 A1* | 1/2014 | Velev | .................... H04W 76/38 |
| | | | 370/331 |

(Continued)

FOREIGN PATENT DOCUMENTS

| EP | 3742815 A1 | 11/2020 |
| WO | 2018088840 A1 | 5/2018 |

OTHER PUBLICATIONS

Supplementary European Search Report in the European application No. 18930021.3. dated Jul. 16, 2021.
(Continued)

*Primary Examiner* — Jean A Gelin
(74) *Attorney, Agent, or Firm* — Ladas & Parry LLP (57) ABSTRACT

The embodiments of the disclosure provide a radio resource control (RRC) connection recovery method and apparatus and a terminal. The method includes that: a terminal receives a paging message triggered by a first node or a second node and determines whether downlink data of a master node (MN) side arrives or downlink data of a secondary node (SN) side arrives based on first information included in the paging message; and the terminal sends an RRC connection recovery message to a third node, the RRC connection recovery message including second information and the second information being configured for the third node to determine whether the third node is an MN or an SN to correspondingly execute a key and a SRB recovery process on the MN side or a key and a SRB recovery process on the SN side.

20 Claims, 4 Drawing Sheets

(51) Int. Cl.
*H04W 76/11* (2018.01)
*H04W 12/06* (2021.01)
*H04W 68/00* (2009.01)

(58) Field of Classification Search
CPC ..... H04W 76/27; H04W 76/28; H04W 76/30; H04W 28/085; H04W 28/16; H04W 12/04; H04W 12/06; H04W 36/0069; H04W 48/20; H04W 68/00; H04W 68/005

See application file for complete search history.

(56) References Cited

U.S. PATENT DOCUMENTS

| | | | | |
|---|---|---|---|---|
| 2018/0092157 | A1* | 3/2018 | Chen | H04W 52/028 |
| 2018/0124636 | A1 | 5/2018 | Ly et al. | |
| 2018/0234894 | A1* | 8/2018 | Jiang | H04W 36/0033 |
| 2018/0270892 | A1* | 9/2018 | Choi | H04W 36/34 |
| 2018/0368018 | A1* | 12/2018 | Kim | H04L 69/08 |
| 2019/0246318 | A1* | 8/2019 | Kim | H04W 76/27 |
| 2020/0396675 | A1 | 12/2020 | Liu et al. | |
| 2021/0051753 | A1* | 2/2021 | Ohlsson | H04W 76/11 |
| 2021/0163134 | A1* | 6/2021 | Hong | B64D 45/00 |

OTHER PUBLICATIONS

Ericsson: "Offline#22 LTE re-establishment and resume while using NR PDCP", 3GPP Draft: R2-1714208, 3rd Generation Partnership Project (3GPP), Mobile Competence Centre; 650, Route Des Lucioles ; F-06921 Sophia-Antipolis Cedex; France, RAN WG2, Reno, US; 20171127-201712012 Dec. 2017 (Dec. 2, 2017).

Interdigital Inc: "Discussion on Handling Split SRB during SCG Failure", 3GPP Draft; R2-1801116, 3rd Generation Partnership Project (3GPP), Mobile Competence Centre; 650,Route Des Lucioles; F-06921 Sophia-Antipolis Cedex;France, RAN WG2, Vancouver, Canada; 20180122-20180126 12 Jan. 2018 (Jan. 12, 2018).

Samsung: "Bearer handling in NR-E-UTRA Dual Connectivity",3GPP Draft; R2-1708439 Bearer Handling in NR-E-UTRA Dual Connectivity, 3rd Generation Partnership Project (3GPP), Mobile Competence Centre; 650, Route Des Lucioles ; F-06921 Sophia-Antipolis Cedex ; RAN WG2, Berlin, Germany; 20170821-20170825 20 Aug. 2017 (Aug. 20, 2017).

Written Opinion of the International Search Authority in the international application No. PCT/CN2018/100709, dated May 15, 2019.

International Search Report to the international application No. PCT/CN2018/100709, dated May 15, 2019.

"Technical Specification Group Radio Access Network; NR; NR and NG-RAN Overall Description; Stage 2 (Release 15)" 3GPP TS 38.300 V1. 1.0. Oct. 31, 2017 (Oct. 31, 2017), pp. 30 and 31.

Intel Corporaton. "Inactive and Dual Connectivity" 3GPP TSG RAN WG2 Meeting #99; R2-1708808, Aug. 25, 2017 (Aug. 25, 2017), entire document.

OPPO. "Discussion of Additional Enhancement for Inactive to Idle State Transition Procedure" 3GPP TSG RAN2 #99; R2-1708368, Aug. 25, 2017 (Aug. 25, 2017), entire document.

\* cited by examiner

METHOD AND APPARATUS FOR RECOVERING RRC CONNECTION, AND TERMINAL

CROSS REFERENCE TO RELATED APPLICATION

This application is a continuation of International Patent Application No. PCT/CN2018/100709 filed on Aug. 15, 2018, the content of which is incorporated herein by reference in its entirety.

TECHNICAL FIELD

Embodiments of the disclosure relate to the technical field of mobile communication, and particularly to a method and apparatus for recoving a radio resource control (RRC) connection, and a terminal.

BACKGROUND a terminal may access a network through two links based on a Dual Connectivity (DC) architecture. A DC network may include a master node (MN) and a secondary node (SN). On the other hand, for reducing air interface signaling, rapidly recovering a wireless connection and rapidly recovering a data service, a new RRC state, i.e., an RRC_INACTIVE state, is defined in a 5th Generation (5G) network environment. This state is different from an RRC_IDLE state and an RRC_ACTIVE state. A terminal is needed to execute an RRC connection recovery process to enter the RRC ACTIVE state from the RRC_INACTIVE state.

In a Multi-Radio Access Type (RAT) DC (MR-DC) mode, due to existence of bearers configured by two nodes, RRC connection recovery in a DC mode is not supported. For MR-DC, an MN and an SN may adopt different RATs. Due to coverage discontinuity, a terminal may reside on the RAT that the SN adopts. In such case, how to recover an RRC connection is a problem to be solved.

SUMMARY

The embodiments of the disclosure provide an RRC connection recovery method and apparatus, and a terminal.

The embodiments of the disclosure provide an RRC connection recovery method, which may include that:

a terminal receives a paging message triggered by a first node or a second node and determines whether downlink data of an MN side arrives or downlink data of an SN side arrives based on first information included in the paging message; and the terminal sends an RRC connection recovery message to a third node, the RRC connection recovery message including second information and the second information being configured for the third node to determine whether the third node is an MN or an SN to correspondingly execute a key and a signaling radio bearer (SRB) recovery process on the MN side or execute a key and SRB recovery process on the SN side.

The embodiments of the disclosure provide a terminal, which may include a processor and a memory. The memory may be configured to store a computer program, and the processor may be configured to call and run the computer program stored in the memory to implement the RRC connection recovery method.

The embodiments of the disclosure provide a chip, which may be configured to implement the RRC connection recovery method.

Specifically, the chip may include a processor, configured to call and run a computer program in a memory to enable a device installed with the chip to implement the RRC connection recovery method.

The embodiments of the disclosure provide a computer-readable storage medium, which may be configured to store a computer program, the computer program causing a computer to implement the RRC connection recovery method.

The embodiments of the disclosure provide a computer program product, which may include a computer program instruction, the computer program instruction causing a computer to implement the RRC connection recovery method.

The embodiments of the disclosure provide a computer program, which may run in a computer to cause the computer to implement the RRC connection recovery method.

Through the technical solutions, in an MR-DC mode, whether downlink data from a MN side arrives or downlink data from a SN side arrives may be indicated through first information in a paging message. The first information may be a first terminal identifier configured by the MN side or a second terminal identifier configured by the SN side. The first information may also be indication information. Therefore, the terminal may recover a DC connection in a DC mode. Meanwhile, the terminal is also supported to recover an RRC connection when a RAT is adopted by the SN side, so that the RRC connection may still be recovered normally in a discontinuous coverage scenario.

BRIEF DESCRIPTION OF THE DRAWINGS

The drawings described herein are adopted to provide a further understanding to the application and form a part of the disclosure. Schematic embodiments of the disclosure and descriptions thereof are adopted to explain the application and not intended to form improper limits to the application. In the drawings.

DETAILED DESCRIPTION

The technical solutions in the embodiments of the disclosure will be described below in combination with the drawings in the embodiments of the disclosure. It is apparent that the described embodiments are not all embodiments but part of embodiments of the disclosure. All other embodiments obtained by those of ordinary skill in the art based on the embodiments in the application without creative work shall fall within the scope of protection of the disclosure.

The technical solutions of the embodiments of the disclosure may be applied to various communication systems, for example, a Global System of Mobile communication (GSM), a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, LTE Time Division Duplex (TDD), a Universal Mobile Telecommunication System (UMTS), a Worldwide Interoperability for Microwave Access (WiMAX) communication system or a future 5G system.

Figure 1:
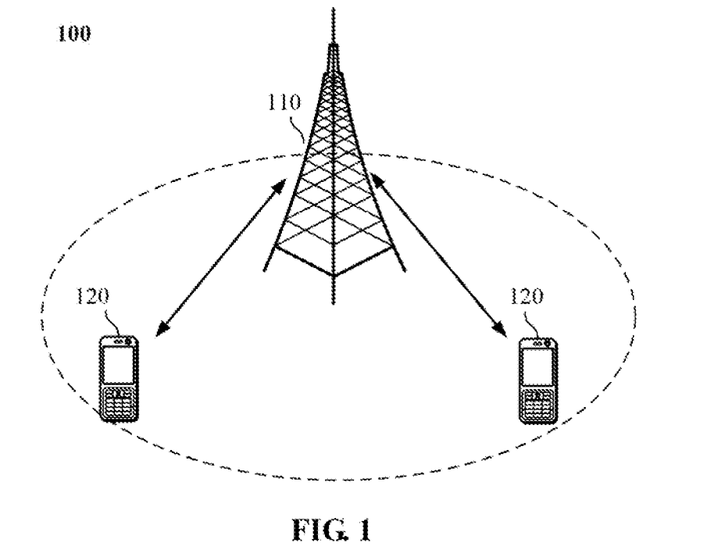
FIG. 1 is a schematic diagram of an architecture of a communication system according to an embodiment of the disclosure.

Exemplarily, a communication system 100 that the embodiments of the disclosure are applied to is shown in FIG. 1. The communication system 100 may include a network device 110, and the network device 110 may be a device communicating with a terminal 120 (or called a communication terminal and a terminal). The network device 110 may provide communication coverage for a specific geographical region and may communicate with a terminal located in the coverage. Optionally, the network device 110 may be a Base Transceiver Station (BTS) in the GSM or the CDMA system, may also be a NodeB (NB) in the WCDMA system, or may also be an Evolutional Node B (eNB or eNodeB) in the LTE system or a wireless controller in a Cloud Radio Access Network (CRAN). Or the network device may be a mobile switching center, a relay station, an access point, a vehicle device, a wearable device, a hub, a switch, a network bridge, a router, a network-side device in a future 5G network, a network device in a future evolved Public Land Mobile Network (PLMN) or the like.

The communication system 100 further includes at least one terminal 120 within the coverage of the network device 110. The "terminal" used herein includes, but not limited to, a device configured to receive/send a communication signal through a wired line connection, for example, through Public Switched Telephone Network (PSTN), Digital Subscriber Line (DSL), digital cable and direct cable connections, and/or another data connection/network and/or through a wireless interface, for example, for a cellular network, a Wireless Local Area Network (WLAN), a digital television network like a Digital Video Broadcasting-Handheld (DVB-H) network, a satellite network and an Amplitude Modulated (AM)-Frequency Modulated (FM) broadcast transmitter, and/or another terminal, and/or an Internet of Things (IoT) device. The terminal configured to communicate through a wireless interface may be called a "wireless communication terminal", a "wireless terminal" or a "mobile terminal." Examples of the mobile terminal include, but not limited to, a satellite or cellular telephone, a Personal Communication System (PCS) terminal capable of combining a cellular radio telephone and data processing, faxing and data communication, a Personal Digital Assistant (PDA) provided with a radio telephone, a pager, Internet/intranet access, a Web browser, a notepad, a calendar and/or a Global Positioning System (GPS) receiver, and a conventional laptop and/or palmtop receiver or another electronic device with a radio telephone transceiver. The terminal may refer to an access terminal, UE, a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a PDA, a handheld device with a wireless communication function, a computing device, another processing device connected to a wireless modem, a vehicle device, a wearable device, a terminal in the 5G network, a terminal in the future evolved PLMN or the like.

Optionally, Device to Device (D2D) communication may be performed between the terminals 120.

Optionally, the 5G system or the 5G network may also be called an NR system or an NR network.

A network device and two terminals are exemplarily shown in FIG. 1. Optionally, the communication system 100 may include multiple network devices and another number of terminals may be included in coverage of each network device. No limits are made thereto in the embodiments of the disclosure.

Optionally, the communication system 100 may further include another network entity such as a network controller and a mobility management entity. No limits are made thereto in the embodiments of the disclosure.

It is to be understood that a device with a communication function in the network/system in the embodiments of the disclosure may be called a communication device. For example, for the communication system 100 shown in FIG. 1, communication devices may include the network device 110 and terminal 120 with the communication function. The network device 110 and the terminal 120 may be the specific devices mentioned above and will not be elaborated herein. The communication devices may further include other devices in the communication system 100, for example, other network entities like a network controller and a mobility management entity. No limits are made thereto in the embodiments of the disclosure.

It is to be understood that terms "system" and "network" in the disclosure may usually be exchanged in the disclosure. In the disclosure, term "and/or" is only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

For meeting the pursuits of people for rates, latencys, high-speed mobility and energy efficiency of services as well as diversity and complexity of services in the future, the 3rd Generation Partnership Project (3GPP) starts researching and developing 5G.

The technical solutions of the embodiments of the disclosure are mainly applied to a 5G system. The technical solutions of the embodiments of the disclosure are not limited to the 5G system and may also be applied to mobile communication systems of other types. Main application scenarios of the 5G system will be described below.

1) An Enhanced Mobile Broadband (eMBB) scenario: eMBB aims to enable a user to obtain a multimedia content, service and data, and service requirements thereof increase rapidly. Since eMBB may be deployed in different scenarios, for example, a room, an urban area and a rural area, and service capabilities and requirements thereof are also greatly different, it is necessary to analyze a service in combination with a specific deployment scenario.

2) An Ultra-Reliable and Low Latency Communication (URLLC) scenario: typical applications of URLLC include industrial automation, power automation, remote medical operation, traffic safety guarantee and the like.

3) An massive Machine Type Communication (mMTC) scenario: typical characteristics of mMTC include high connection density, small data volume, latency-insensitive services, low cost and long service life of modules and the like.

A radio part of 5G is called NR. During early deployment of NR, it is unlikely to implement complete NR coverage, so typical network coverage is a combination of LTE coverage and NR coverage. In addition, for protecting early investments of a mobile operating company in LTE, a working mode of tight interworking between LTE and NR is proposed. An NR cell may also be deployed independently.

On the other hand, a DC architecture includes EN-DC, NR-E-UTRAN DC (NE-DC), 5G Core (5GC)-EN-DC and NR DC. In EN-DC, an LTE node as an MN and an NR node as an SN are connected to an Evolved Packet Core (EPC) network. In NE-DC, an NR node as an MN and an Enhanced LTE (eLTE) node as an SN are connected to a 5GC network. In 5GC-EN-DC, an eLTE node as an MN and an NR node as an SN are connected to the SGC network. In NR DC, an NR node as an MN and an NR node as an SN are connected to the 5GC network.

Figure 2:
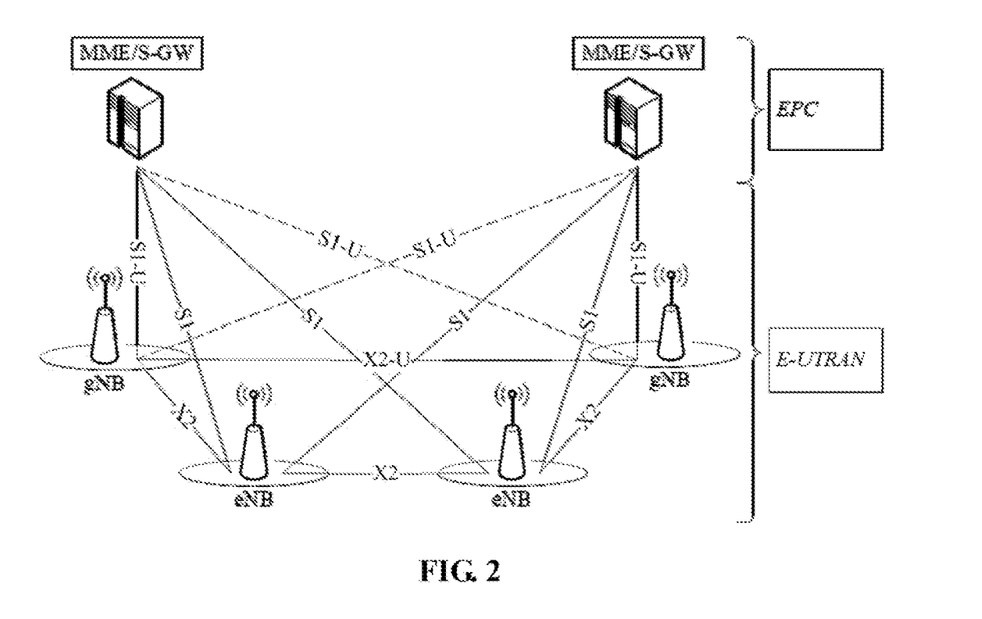
FIG. 2 is an overall networking architecture diagram of Evolved Universal Terrestrial Radio Access Network (E-UTRAN) New Radio (NR) DC (EN-DC) according to an embodiment of the disclosure.

Referring to FIG. 2, FIG. 2 is an overall networking architecture diagram of EN-DC. An eNB is an LTE base station, a gNB is an NR base station, the eNB and the gNB belong to an E-UTRAN. An EPC network includes a Mobility Management Entity (MME)/Serving Gateway (S-GW).

For reducing air interface signaling, rapidly recovering a wireless connection and rapidly recovering a data service, a new RRC state, i.e., an RRC_INACTIVE state, is defined in a 5G network environment. This state is different from an RRC_IDLE state and an RRC_ACTIVE (i.e., RRC_CONNECTED) state.

RRC_IDLE: mobility is based on cell selection and reselection of UE, paging is initiated by a Core Network (CN), and a paging region is configured by the CN. There is no UE Access Stratum (AS) context on a base station side. There is no RRC connection.

RRC_CONNECTED: there is an RRC connection, and the base station and the UE have the UE AS context. A position, known by a network side, of the UE is of a specific cell level. Mobility is controlled by the network side. Unicast data may be transmitted between the UE and the base station.

RRC_INACTIVE: mobility is based on cell selection and reselection of the UE, there is a CN-NR connection, the UE AS context exists in a certain base station, paging is triggered by a Radio Access Network (RAN), a RAN-based paging region is managed by the RAN, and the position, known by the network side, of the UE is of a RAN-based paging region level.

When the UE enters the RRC_CONNECTED state from the RRC_INACTIVE state, there are three conditions.

First is: downlink data arrives at the UE, and the network side initiates RAN initiated paging to cause the UE to enter the connected state.

Second is: the UE initiates RAN location update, for example, periodic RAN location update or cross-area location update.

Third is: the UE has a need for transmitting uplink data and thus the UE is caused to enter the connected state.

For an RRC connection recovery process, UE sends Message 3 (MSG3) (an RRC recovery request) to a target base station. Then, on the UE side, SRB1 is recovered and AS security is activated. Message 4 (MSG4) is waited to be received on the SRB1. Meanwhile, all bearer configurations may be simultaneously recovered through the MSG4.

Figure 3:
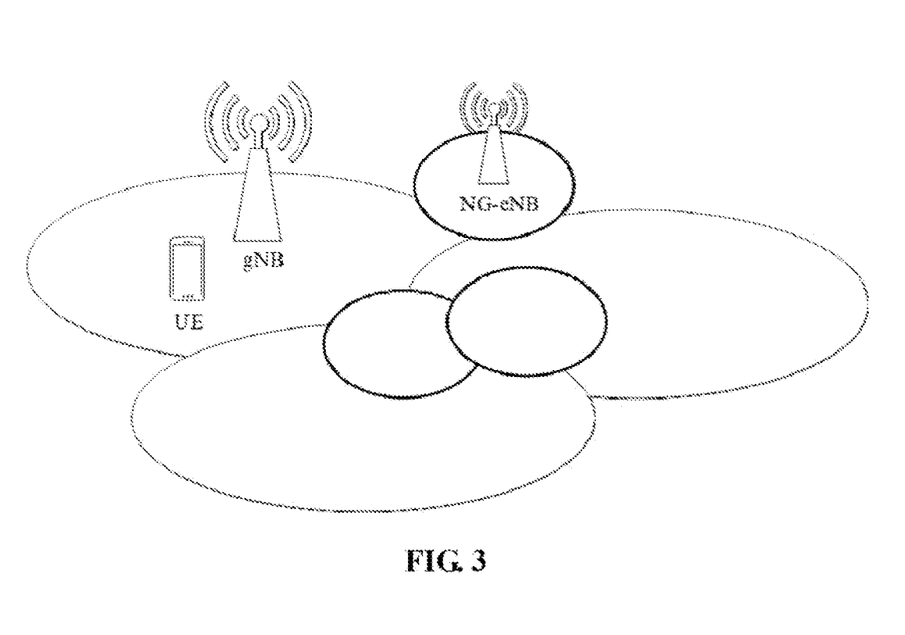
FIG. 3 is a schematic diagram of a region where User Equipment (UE) resides according to an embodiment of the disclosure.

In an MR-DC mode, due to existence of bearers configured by two nodes, RRC connection recovery in a DC mode is not supported. For MR-DC, an MN and an SN may adopt different RATs. Due to coverage discontinuity, referring to FIG. 3, UE may reside in the RAT that the SN adopts. Therefore, it is very important to support the UE to recover an RRC connection from the RAT that the SN adopts.

Figure 4:
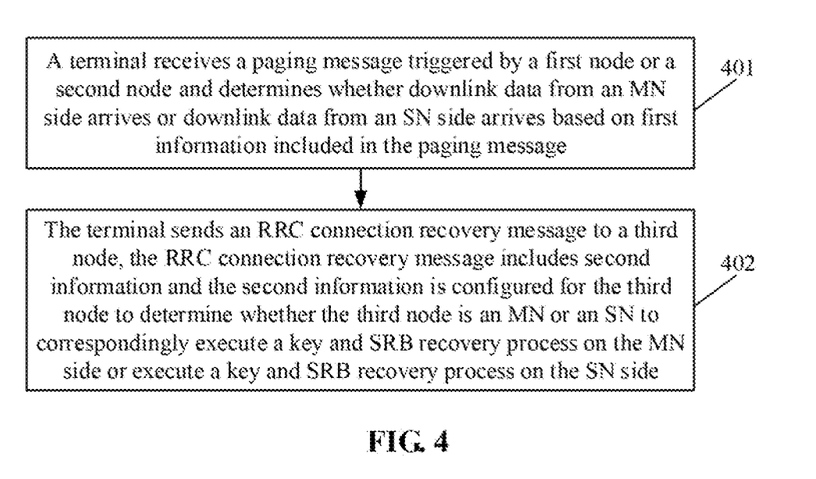
FIG. 4 is a flowchart of an RRC connection recovery method according to an embodiment of the disclosure.

FIG. 4 is a flowchart of an RRC connection recovery method according to an embodiment of the disclosure. As shown in FIG. 4, the RRC connection recovery method includes the following operations.

In operation 401, a terminal receives a paging message triggered by a first node or a second node and determines whether downlink data from an MN side arrives or downlink data from an SN side arrives based on first information included in the paging message.

In the embodiment of the disclosure, the terminal may be any device capable of communicating with a network, such as a mobile phone, a tablet computer, a vehicle terminal device and a notebook computer.

In the embodiment of the disclosure, the first node may be an MN in a DC network. The second node may be an SN in the DC network. The DC network may be in, but not limited to, an MR-DC mode.

In the embodiment of the disclosure, the first information is configured to indicate whether the downlink data from the MN side arrives or the downlink data from the SN side arrives. The first information may be implemented in the following manners.

A first manner: the first information refers to a first terminal identifier (an Active Radio Network Temporary Identity (I-RNTI) 1) allocated to the terminal by the first node or a second terminal identifier (an I-RNTI 2) allocated to the terminal by the second node. The first terminal identifier is configured to indicate that the first node is an MN, and the second terminal identifier is configured to indicate that the second node is an SN. The terminal may determine that the downlink data from the MN side arrives based on the first terminal identifier and may determine that the downlink data from the SN side arrives based on the second terminal identifier.

A second manner: the first information is first indication information or second indication information. The first indication information is configured to indicate that the downlink data from the MN side arrives, and the second indication information is configured to indicate that the downlink data from the SN side arrives.

In operation 402, the terminal sends an RRC connection recovery message to a third node. The RRC connection recovery message includes second information and the second information is configured for the third node to determine whether the third node is an MN or an SN to correspondingly execute a key and SRB recovery process on the MN side or execute a key and SRB recovery process on the SN side.

In the embodiment of the disclosure, corresponding to the two implementation manners of the first information, the key and SRB recovery process in the embodiment of the disclosure may be also correspondingly implemented in the following two manners.

A First Manner

Before operation 401, the terminal receives an RRC connection release message from the first node. The RRC connection release message may include the first terminal identifier allocated to the terminal by the first node and the second terminal identifier allocated to the terminal by the second node. The first terminal identifier is configured to indicate that the first node is an MN and the second terminal identifier is configured to indicate that the second node is an SN. Based on this, 1) in response to the terminal receiving the paging message triggered by the first node and the paging message including the first terminal identifier, the terminal may determine that the downlink data from the MN side arrives based on the first terminal identifier; and 2) in response to the terminal receiving the paging message triggered by the second node and the paging message including the second terminal identifier, the terminal may determine that the downlink data from the SN side arrives based on the second terminal identifier.

Based on this, 1) in response to the terminal receiving the paging message triggered by the first node and the paging message including the first terminal identifier, the terminal may determine that the downlink data from the MN side arrives based on the first terminal identifier; and 2) in response to the terminal receiving the paging message triggered by the second node and the paging message including the second terminal identifier, the terminal may determine that the downlink data from the SN side arrives based on the second terminal identifier.

In the embodiment of the disclosure, 1) in response to the downlink data from the MN side arriving, the terminal may generate first security information by use of the key on the MN side or a key derived based on the key on the MN side, and may include the first security information into the RRC connection recovery message to send the first security information to the third node; and 2) in response to the downlink data from the SN side arriving, the terminal may generate second security information by use of the key on the SN side or a key derived based on the key on the SN side, and may include the second security information into the RRC connection recovery message to send the second security information to the third node.

In the solution, 1) in a case that the RRC connection recovery message includes the first terminal identifier and the first security information, information included in the RRC connection recovery message is configured for the third node to, after receiving the RRC connection recovery message, perform addressing for the first node based on the first terminal identifier, send the first security information to the first node for security authentication and recover the key and SRB on the MN side after the security authentication succeeds; and 2) in a case that the RRC connection recovery message includes the second terminal identifier and the second security information, the information included in the RRC connection recovery message is used for the third node to, after receiving the RRC connection recovery message, perform addressing for the second node based on the second terminal identifier, send the second security information to the second node for security authentication and recover the key and SRB on the SN side after the security authentication succeeds.

In the solution of the embodiment of the disclosure, recovering the SRB on the MN side may refer to recovering SRB1 and SRB2, and recovering the SRB on the SN side may refer to recovering SRB3.

Then, the terminal may receive an RRC connection recovery response message from the third node. The RRC connection recovery response message may include third information and the third information is configured to indicate whether the third node is an MN or an SN. Furthermore, when the third information indicates that the third node is an MN, the third information may further indicate at least one SN specified by the third node. When the third information indicates that the third node is an SN, the third information may further indicate an MN specified by the third node.

The first manner will be exemplarily described below through a specific example.

1: When an MN of a network side is intended to release UE to an inactive state, the MN and an SN may negotiate about I-RNTI allocation. In such case, each of the MN and the SN may allocate an I-RNTI to the UE and configure the I-RNTI for the UE in an RRCRease message.

2: The UE stores radio resource configuration information from the MN and the SN and saves the corresponding I-RNTIs respectively. The MN and the SN may also save an AS context of the UE and the corresponding I-RNTI.

3: Downlink data arrives at an MN or SN side to trigger the network side to send a paging message:

1) in response to the downlink data arriving at the MN side, the MN triggers the paging message to be sent and transmits the paging message by taking the I-RNTI allocated by the MN as a UE identifier for paging by the UE; and 2) in response to the downlink data arriving at the SN side, the SN triggers the paging message to be sent and transmits the paging message by taking the I-RNTI allocated by the SN as the UE identifier for paging by the UE.

4: The UE receives the paging message and judges whether the downlink data of the MN or the downlink data of the SN arrives at the network side through the UE identifier in the paging message.

5: The UE initiates an RRC connection recovery process:

1) when the downlink data arrives at the MN side, the UE adopts a key on the MN side or a key derived based on the key on the MN side as a key for calculation of a Media Access Control Identifier (MAC-I) in Message 3 (MSG3); and 2) when the downlink data arrives at the SN side, the UE adopts a key on the SN side or a key derived based on the key on the SN side as the key for calculation of a MAC-I in MSG3.

6: The network side receives the MSG3 (an RRC connection recovery request) and trace to the original base station based on the I-RNTI. The original base station judges whether the original base station is the MN or the SN based on the I-RNTI. The original base station, after performing security authentication on the UE, sends UE context to the target base station. Then, the target base station recovers the key and an SRB. When the target base station is an MN in a present connection, the new MN determines an SN and configures it in an MSG4. When the target base station is not an MN (but an SN), the target base station indicates a specific node as an MN.

7: The UE receives the MSG4 (knowing whether the target node is an SN or an MN) and may judge whether the SRB recovered in the present target base station is SRB1 or SRB3.

A Second Manner

Before the operation 401, the terminal may receive a connection release message from the first node. The RRC connection release message may include the first terminal identifier allocated to the terminal by the first node. 1) In response to the terminal receiving the paging message triggered by the first node and the paging message including the first indication information, the terminal may determine that the downlink data from the MN side arrives based on the first indication information. 2) In response to the terminal receiving the paging message triggered by the second node and the paging message including the second indication information, the terminal may determine that the downlink data from the SN side arrives based on the second indication information.

Based on this, 1) when the downlink data from the MN side arrives, the second information in the RRC connection recovery message is third indication information and the third indication information is configured to indicate that the third node is an MN; and 2) when the downlink data from the SN side arrives, the second information in the RRC connection recovery message is fourth indication information and the fourth indication information is configured to indicate that the third node is an SN.

In the embodiment of the disclosure, 1) in response to the downlink data from the MN side arriving, the terminal may generate the first security information by use of the key on the MN side or a key derived based on the key on the MN side and may include the first security information into the RRC connection recovery message to send the first security information to the third node; and 2) in response to the downlink data from the SN side arriving, the terminal may generate the second security information by use of the key on the SN side or a key derived based on the key on the SN side and may include the second security information into the RRC connection recovery message to send the second security information to the third node.

In the solution, 1) when the RRC connection recovery message includes the first terminal identifier, the third indication information and the first security information, the information included in the RRC connection recovery message is used for the third node to, after receiving the RRC connection recovery message, perform addressing for the first node based on the first terminal identifier and send the third indication information and the first security information to the first node to enable the first node to determine based on the third indication information that it is required to perform security authentication on the first security information, and the third node recovers the key and SRB on the MN side after the security authentication succeeds; and 2) when the RRC connection recovery message includes the first terminal identifier, the fourth indication information and the second security information, the information included in the RRC connection recovery message is used for the third node to, after receiving the RRC connection recovery message, perform addressing for the first node based on the first terminal identifier and send the fourth indication information and the second security information to the first node to enable the first node to determine based on the fourth indication information that the second security information is required to be forwarded to the second node for security authentication, and the third node recovers the key and SRB on the SN side after the security authentication succeeds.

In the solution of the embodiment of the disclosure, recovering the SRB on the MN side may refer to recovering the SRB1 and the SRB2, and recovering the SRB on the SN side may refer to recovering the SRB3.

Then, the terminal may receive a RRC connection recovery response message from the third node. The RRC connection recovery response message may include the third information and the third information is configured to indicate whether the third node is an MN or an SN. Furthermore, when the third information indicates that the third node is an MN, the third information may further indicate at least one SN specified by the third node. When the third information indicates that the third node is an SN, the third information may further indicate an MN specified by the third node.

The second manner will be exemplarily described below through a specific example.

1: When an MN of a network side is intended to release UE to an inactive state, the MN and an SN may negotiate about I-RNTI allocation. In such case, the MN allocates an I-RNTI to the UE and configures the I-RNTI for the UE in an RRCRease message. The I-RNTI uniquely identifies a UE context in the two nodes, i.e., the MN and the SN.

2: The UE stores radio resource configuration information from the MN and the SN and saves the I-RNTI. The MN and the SN may also save the AS context of the UE and the I-RNTI.

3: Downlink data arrives at an MN or SN side to trigger the network side to send a paging message. In such case, the paging message indicates whether the node that the downlink data arrives at is the MN or the SN:

1) in response to the downlink data arriving at the MN side, the MN triggers the paging message to be sent and transmits the paging message by taking the I-RNTI as a UE identifier for paging by the UE; and 2) in response to the downlink data arriving at the SN side, the SN triggers the paging message to be sent and transmits the paging message by taking the I-RNTI as the UE identifier for paging by the UE.

4: The UE receives the paging message and judges whether the downlink data of the MN or the downlink data of the SN arrives at the network side through an indication in the paging message.

5: The UE initiates an RRC connection recovery process. The UE indicates whether a target base station for RRC connection recovery is an MN or an SN or whether a recovered key is a key on the MN side or a key on the SN side in an RRC connection recovery request message:

1) in a case that the downlink data arrives at the MN side, the UE adopts the key on the MN side or a verification key of the key on the MN side as a key for calculation of a MAC-I in an MSG3.

2) in a case that the downlink data arrives at the SN side, the UE adopts the key on the SN side or a verification key of the key on the SN side as a key for calculation of a MAC-I in MSG3.

6: The network side receives the RRC connection recovery request and traces to the original base station based on the I-RNTI. The target base station simultaneously indicates an indication included in the RRC connection recovery request of the UE, namely indicating whether a target node for RRC connection recovery is an MN or an SN or whether the recovered key is the key on the MN side or the key on the SN side. The original base station judges whether to forward the RRC connection recovery request to the SN side or not according to the indication. Then, the key and an SRB are recovered. When the target base station is an MN in a present connection, the new MN determines an SN and configures it in an MSG4. When the target base station is not an MN, the target base station indicates a specific node as an MN.

7: The UE receives the MSG4 and may judge whether the SRB recovered at the present target base station is SRB1 or SRB3.

Figure 5:
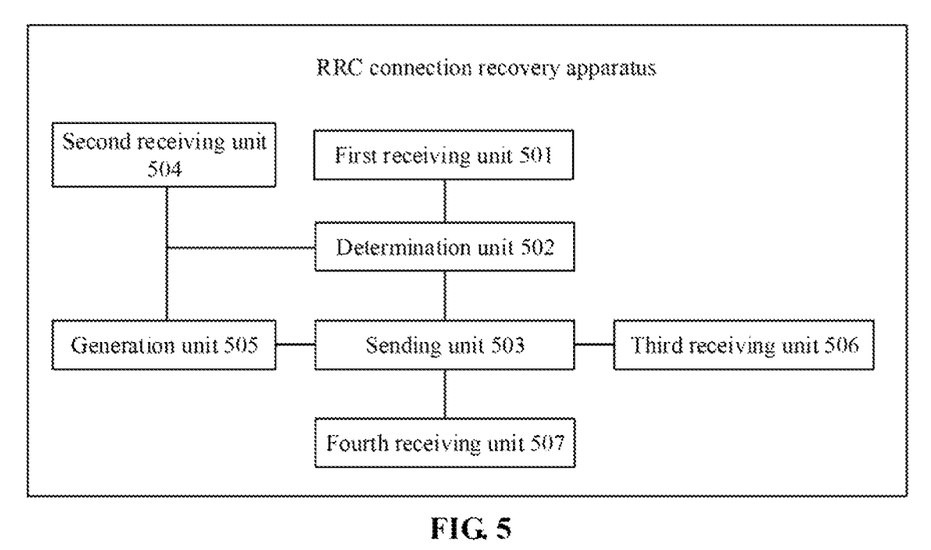
FIG. 5 is a structure composition diagram of an RRC connection recovery apparatus according to an embodiment of the disclosure.

FIG. 5 is a structure composition diagram of an RRC connection recovery apparatus according to an embodiment of the disclosure. As shown in FIG. 5, the apparatus includes a first receiving unit 501, a determination unit 502 and a sending unit 503.

The first receiving unit 501 is configured to receive a paging message triggered by a first node or a second node.

The determination unit 502 is configured to determine whether downlink data of an MN side arrives or downlink data of an SN side arrives based on first information included in the paging message.

The sending unit 503 is configured to send an RRC connection recovery message to a third node. The RRC connection recovery message may include second information and the second information is configured for the third node to determine whether the third node is an MN or an SN to correspondingly execute a key and a SRB recovery process on the MN side or execute a key and a SRB recovery process on the SN side.

In an implementation mode, the apparatus may further include a second receiving unit 504.

The second receiving unit 504 is configured to receive an RRC connection release message from the first node. The RRC connection release message may include a first terminal identifier allocated to a terminal by the first node and a second terminal identifier allocated to the terminal by the second node.

The first terminal identifier is configured to indicate that the first node is an MN, and the second terminal identifier is configured to indicate that the second node is an SN.

In an implementation mode, in response to the first receiving unit 501 receiving the paging message triggered by the first node and the paging message including the first terminal identifier, the determination unit 502 is configured to determine that the downlink data from the MN side arrives based on the first terminal identifier.

In response to the first receiving unit 501 receiving the paging message triggered by the second node and the paging message including the second terminal identifier, the determination unit 502 is configured to determine that the downlink data from the SN side arrives based on the second terminal identifier.

In an implementation mode, in a case that the downlink data from the MN side arrives, the second information in the RRC connection recovery message may be the first terminal identifier.

In a case that the downlink data from the SN side arrives, the second information in the RRC connection recovery message may be the second terminal identifier.

In an implementation mode, the apparatus may further include a generation unit 505.

In response to the downlink data from the MN side arriving, the generation unit 505 is configured to generate first security information based on the key on the MN side or a key derived based on the key on the MN side, and the sending unit 503 is configured to include the first security information into the RRC connection recovery message to send the first security information to the third node.

In response to the downlink data from the SN side arriving, the generation unit 505 is configured to generate second security information based on the key on the SN side or a key derived based on the key on the SN side, and the sending unit 503 is configured to include the second security information into the RRC connection recovery message to send the second security information to the third node.

In an implementation mode, when the RRC connection recovery message includes the first terminal identifier and the first security information, the information included in the RRC connection recovery message is used for the third node to, after receiving the RRC connection recovery message, perform addressing for the first node based on the first terminal identifier, send the first security information to the first node for security authentication and recover the key and SRB on the MN side after the security authentication succeeds.

When the RRC connection recovery message includes the second terminal identifier and the second security information, the information included in the RRC connection recovery message is used for the third node to, after receiving the RRC connection recovery message, perform addressing for the second node based on the second terminal identifier, send the second security information to the second node for security authentication and recover the key and SRB on the SN side after the security authentication succeeds.

In an implementation mode, the apparatus may further include a third receiving unit 506.

The third receiving unit 506 is configured to receive a RRC connection release message from the first node, the RRC connection release message including the first terminal identifier allocated to the terminal by the first node.

In an implementation mode, in response to the first receiving unit 501 receiving the paging message triggered by the first node and the paging message including first indication information, the determination unit 502 is configured to determine that the downlink data from the MN side arrives based on the first indication information.

In response to the first receiving unit 501 receiving the paging message triggered by the second node and the paging message including the second indication information, the determination unit 502 is configured to determine that the downlink data from the SN side arrives based on the second indication information.

In an implementation mode, when the downlink data from the MN side arrives, the second information in the RRC connection recovery message is third indication information and the third indication information is configured to indicate that the third node is an MN.

When the downlink data from the SN side arrives, the second information in the RRC connection recovery message is fourth indication information and the fourth indication information is configured to indicate that the third node is an SN.

In an implementation mode, the apparatus may further include a generation unit 505.

In response to the downlink data from the MN side arriving, the generation unit 505 is configured to generate the first security information by use of the key on the MN side or a key derived based on the key on the MN side, and the sending unit 503 is configured to include the first security information into the RRC connection recovery message for sending to the third node.

In response to the downlink data from the SN side arriving, the generation unit 505 is configured to generate the second security information by use of the key on the SN side or a key derived based on the key on the SN side, and the sending unit 503 is configured to include the second security information into the RRC connection recovery message for sending to the third node.

In an implementation mode, when the RRC connection recovery message includes the first terminal identifier, the third indication information and the first security information, the information included in the RRC connection recovery message is used for the third node to, after receiving the RRC connection recovery message, perform addressing for the first node based on the first terminal identifier and send the third indication information and the first security information to the first node to enable the first node to determine based on the third indication information that it is required to perform security authentication on the first security information, and the third node recovers the key and SRB on the MN side after the security authentication succeeds.

When the RRC connection recovery message includes the first terminal identifier, the fourth indication information and the second security information, the information included in the RRC connection recovery message is used for the third node to, after receiving the RRC connection recovery message, perform addressing for the first node based on the first terminal identifier and send the fourth indication information and the second security information to the first node to enable the first node to determine based on the fourth indication information that the second security information is required to be forwarded to the second node for security authentication, and the third node recovers the key and SRB on the SN side after the security authentication succeeds.

In an implementation mode, recovering the SRB on the MN side may refer to recovering SRB1 and SRB2.

Recovering the SRB on the SN side may refer to recovering SRB3.

In an implementation mode, the apparatus may further include a fourth receiving unit 507.

The fourth receiving unit 507 is configured to receive an RRC connection recovery response message from the third node. The RRC connection recovery response message may include third information and the third information is configured to indicate whether the third node is an MN or an SN.

In an implementation mode, when the third information indicates that the third node is an MN, the third information may further indicate at least one SN specified by the third node.

When the third information indicates that the third node is an SN, the third information may further indicate an MN specified by the third node.

It is understood by those skilled in the art that the related descriptions about the RRC connection recovery apparatus of the embodiment of the disclosure may be understood with reference to the related descriptions about the RRC connection recovery method of the embodiments of the disclosure.

Figure 6:
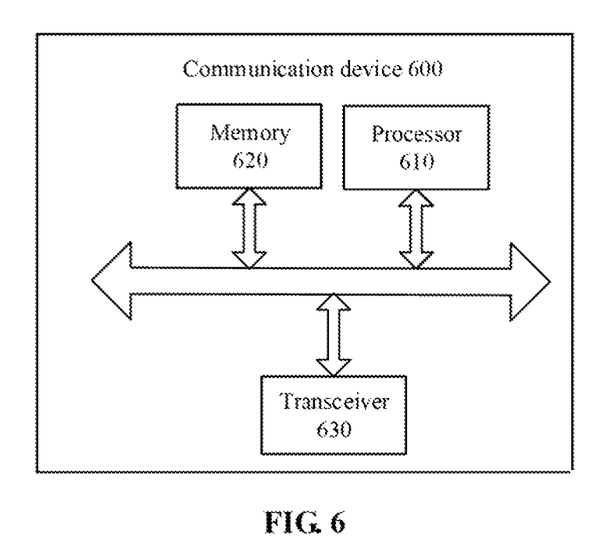
FIG. 6 is a schematic structure diagram of a communication device according to an embodiment of the disclosure.

FIG. 6 is a schematic structure diagram of a communication device 600 according to an embodiment of the disclosure. The communication device may be a terminal. The communication device 600 shown in FIG. 6 includes a processor 610, and the processor 610 may call and run a computer program in a memory to implement the method in the embodiments of the disclosure.

Optionally, as shown in FIG. 6, the communication device 600 may further include the memory 620. The processor 610 may call and run the computer program in the memory 620 to implement the method in the embodiments of the disclosure.

The memory 620 may be independent of the processor 610 or may be integrated into the processor 610.

Optionally, as shown in FIG. 6, the communication device 600 may further include a transceiver 630. The processor 610 may control the transceiver 630 to communicate with another device, specifically sending information or data to the other device or receiving information or data from another device.

The transceiver 630 may include a transmitter and a receiver. The transceiver 630 may further include antennae, and the number of the antennae may be one or more.

Optionally, the communication device 600 may specifically be the network device of the embodiments of the disclosure. The communication device 600 may implement corresponding flows implemented by the network device in each method of the embodiments of the disclosure. For simplicity, elaborations are omitted herein.

Optionally, the communication device 600 may specifically be the mobile terminal/terminal of the embodiments of the disclosure. The communication device 600 may implement corresponding flows implemented by the mobile terminal/terminal in each method of the embodiments of the disclosure. For simplicity, elaborations are omitted herein.

Figure 7:
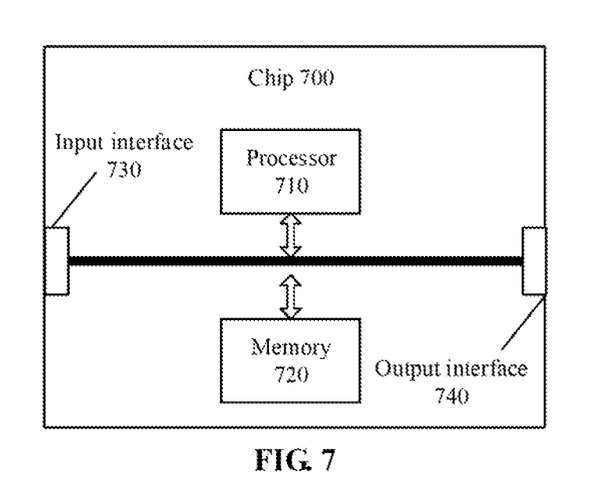
FIG. 7 is a schematic structure diagram of a chip according to another embodiment of the disclosure.

FIG. 7 is a schematic structure diagram of a chip according to another embodiment of the disclosure. The chip 700 shown in FIG. 7 includes a processor 710, and the processor 710 may call and run a computer program in a memory to implement the method in the embodiments of the disclosure.

Optionally, as shown in FIG. 7, the chip 700 may further include the memory 720. The processor 710 may call and run the computer program in the memory 720 to implement the method in the embodiments of the disclosure.

The memory 720 may be an independent device independent of the processor 710 or may also be integrated into the processor 710.

Optionally, the chip 700 may further include an input interface 730. The processor 710 may control the input interface 730 to communicate with another device or chip, specifically acquiring information or data from another device or chip.

Optionally, the chip 700 may further include an output interface 740. The processor 710 may control the output interface 740 to communicate with another device or chip, specifically outputting information or data from another device or chip.

Optionally, the chip may be applied to the network device of the embodiments of the disclosure, and the chip may implement corresponding flows implemented by the network device in each method of the embodiments of the disclosure. For simplicity, elaborations are omitted herein.

Optionally, the chip may be applied to the mobile terminal/terminal of the embodiment of the disclosure, and the chip may implement corresponding flows implemented by the mobile terminal/terminal in each method of the embodiments of the disclosure. For simplicity, elaborations are omitted herein.

It is to be understood that the chip mentioned in the embodiment of the disclosure may also be called a system-level chip, a system chip, a chip system or a system on chip, etc.

Figure 8:
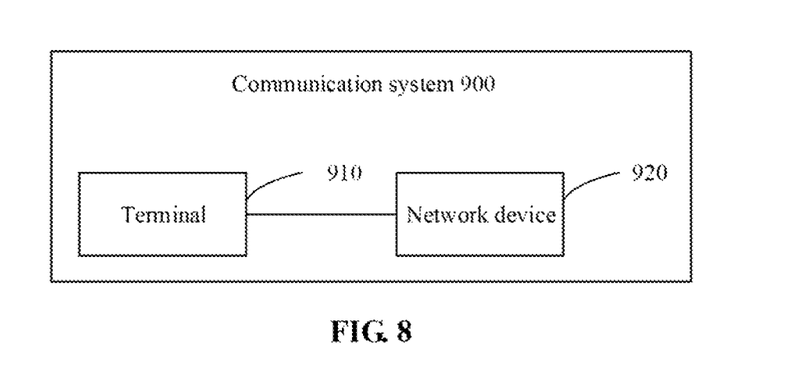
FIG. 8 is a schematic block diagram of a communication system according to an embodiment of the disclosure.

FIG. 8 is a second block diagram of a communication system 900 according to an embodiment of the disclosure. As shown in FIG. 8, the communication system 900 includes a terminal 910 and a network device 920.

The terminal 910 may be configured to realize corresponding functions realized by the terminal in the method. The network device 920 may be configured to realize corresponding functions realized by the network device in the method. For simplicity, elaborations are omitted herein.

It is to be understood that the processor in the embodiment of the disclosure may be an integrated circuit chip and has a signal processing capacity. In an implementation process, each operation of the method embodiments may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, operation and logical block diagram disclosed in the embodiments of the disclosure may be implemented or executed. The universal processor may be a microprocessor or the processor may also be any conventional processor and the like. The operations of the method disclosed in combination with the embodiments of the disclosure may be directly embodied to be executed and completed by a hardware decoding processor or executed and completed by a combination of hardware and software modules in the decoding processor. The software module may be located in a mature storage medium in this field such as a Random Access Memory (RAM), a flash memory, a Read-Only Memory (ROM), a Programmable ROM (PROM) or Electrically Erasable PROM (EEPROM) and a register. The storage medium is located in a memory, and the processor reads information in the memory, and completes the operations of the method in combination with hardware.

It can be understood that the memory in the embodiment of the disclosure may be a volatile memory or a nonvolatile memory, or may include both the volatile and nonvolatile memories. The nonvolatile memory may be a ROM, a PROM, an Erasable PROM (EPROM), an EEPROM or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DR RAM). It is to be noted that the memory of a system and method described in the disclosure is intended to include, but not limited to, memories of these and any other proper types.

It is to be understood that the memory is exemplarily but unlimitedly described. For example, the memory in the embodiments of the disclosure may also be an SRAM, a DRAM, an SDRAM, a DDR SDRAM, an ESDRAM, an SLDRAM and a DR RAM. That is, the memory in the embodiments of the disclosure is intended to include, but not limited to, memories of these and any other proper types.

The embodiments of the disclosure also provide a computer-readable storage medium, which is configured to store a computer program.

Optionally, the computer-readable storage medium may be applied to a network device in the embodiments of the disclosure. The computer program enables a computer to execute corresponding flows implemented by the network device in each method of the embodiments of the disclosure. For simplicity, elaborations are omitted herein.

Optionally, the computer-readable storage medium may be applied to a mobile terminal/terminal in the embodiments of the disclosure. The computer program enables a computer to execute corresponding flows implemented by the mobile terminal/terminal in each method of the embodiments of the disclosure. For simplicity, elaborations are omitted herein.

The embodiments of the disclosure also provide a computer program product, which includes a computer program instruction.

Optionally, the computer program product may be applied to a network device in the embodiments of the disclosure. The computer program instruction enables a computer to execute corresponding flows implemented by the network device in each method of the embodiments of the disclosure. For simplicity, elaborations are omitted herein.

Optionally, the computer program product may be applied to a mobile terminal/terminal in the embodiments of the disclosure. The computer program instruction enables the computer to execute corresponding flows implemented by the mobile terminal/terminal in each method of the embodiments of the disclosure. For simplicity, elaborations are omitted herein.

The embodiments of the disclosure also provide a computer program.

Optionally, the computer program may be applied to a network device in the embodiments of the disclosure. The computer program runs in a computer to enable the computer to execute corresponding flows implemented by the network device in each method of the embodiments of the disclosure. For simplicity, elaborations are omitted herein.

Optionally, the computer program may be applied to a mobile terminal/terminal in the embodiments of the disclosure. The computer program runs in the computer to enable the computer to execute corresponding flows implemented by the mobile terminal/terminal in each method of the embodiments of the disclosure. For simplicity, elaborations are omitted herein.

Those of ordinary skill in the art may realize that the units and algorithm operations of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the disclosure.

Those skilled in the art may clearly learn about that specific working processes of the system, device and unit described above may refer to the corresponding processes in the method embodiment and will not be elaborated herein for convenient and brief description.

In some embodiments provided by the application, it is to be understood that the disclosed system, device and method may be implemented in another manner. For example, the apparatus embodiment described above is only schematic. For example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the apparatus or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the disclosure may be integrated into a processing unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the operations of the method in each embodiment of the disclosure. The abovementioned storage medium includes: various media capable of storing program codes such as a U disk, a mobile hard disk, a ROM, a RAM, a magnetic disk or an optical disk.

The above is only the specific implementation mode of the disclosure and not intended to limit the scope of protection of the disclosure. Any variations or replacements apparent to those skilled in the art within the technical scope disclosed by the application shall fall within the scope of protection of the disclosure. Therefore, the scope of protection of the disclosure shall be subject to the scope of protection of the claims.

The invention claimed is:

1. A method for recovering a radio resource control (RRC) connection, comprising:
    receiving, by a terminal, a paging message triggered by a first node or a second node;
    determining, by a terminal, whether downlink data from a master node (MN) side arrives or downlink data from a secondary node (SN) side arrives based on first information included in the paging message; and
    sending, by the terminal, an RRC connection recovery message to a third node, wherein the RRC connection recovery message includes second information and the second information is configured for the third node to determine whether the third node is an MN or an SN to correspondingly execute a key and a signaling radio bearer (SRB) recovery process on the MN side or execute a key and a SRB recovery process on the SN side.

2. The method of claim 1, before receiving, by the terminal, the paging message triggered by the first node or the second node, the method further comprising:
    receiving, by the terminal, an RRC connection release message from the first node,
    wherein the RRC connection release message includes a first terminal identifier allocated to the terminal by the first node and a second terminal identifier allocated to the terminal by the second node,
    the first terminal identifier is configured to indicate that the first node is an MN and the second terminal identifier being configured to indicate that the second node is an SN.

3. The method of claim 2, wherein receiving, by the terminal, the paging message triggered by the first node or the second node and determining whether the downlink data from the MN side arrives or the downlink data from the SN side arrives based on the first information included in the paging message comprises:
    in response to the terminal receiving the paging message triggered by the first node and the paging message including the first terminal identifier, determining, by the terminal, that the downlink data from the MN side arrives based on the first terminal identifier; and
    in response to the terminal receiving the paging message triggered by the second node and the paging message including the second terminal identifier, determining, by the terminal, that the downlink data from the SN side arrives based on the second terminal identifier.

4. The method of claim 2, wherein
    in a case that the downlink data from the MN side arrives, the second information in the RRC connection recovery message is the first terminal identifier; and
    in a case that the downlink data from the SN side arrives, the second information in the RRC connection recovery message is the second terminal identifier.

5. The method of claim 4, further comprising:
    in response to the downlink data from the MN side arriving, generating, by the terminal, first security information based on the key on the MN side or a key derived based on the key on the MN side, and including, by the terminal, the first security information into the RRC connection recovery message to send the first security information to the third node; and
    in response to the downlink data from the SN side arriving, generating, by the terminal, second security information based on the key on the SN side or a key derived based on the key on the SN side, and including, by the terminal, the second security information into the RRC connection recovery message to send the second security information to the third node.

6. The method of claim 5, wherein
    in a case that the RRC connection recovery message includes the first terminal identifier and the first security information, the information included in the RRC connection recovery message is used for the third node to, after receiving the RRC connection recovery message, perform addressing for the first node based on the first terminal identifier, send the first security information to the first node for security authentication, and recover the key and SRB on the MN side after the security authentication succeeds; and
    in a case that the RRC connection recovery message includes the second terminal identifier and the second security information, the information included in the RRC connection recovery message is used for the third node to, after receiving the RRC connection recovery message, perform addressing for the second node based on the second terminal identifier, send the second security information to the second node for security authentication, and recover the key and SRB on the SN side after the security authentication succeeds.

7. The method of claim 6, wherein
recovering the SRB on the MN side refers to recovering SRB1 and SRB2; and
recovering the SRB on the SN side refers to recovering SRB3.

8. The method of claim 1, further comprising:
receiving, by the terminal, an RRC connection recovery response message from the third node, wherein the RRC connection recovery response message includes third information and the third information is configured to indicate whether the third node is an MN or an SN.

9. The method of claim 8, wherein
when the third information indicates that the third node is an MN, the third information further indicates at least one SN specified by the third node; and
when the third information indicates that the third node is an SN, the third information further indicates an MN specified by the third node.

10. A communication device, comprising:
a transceiver, configured to receive a paging message triggered by a first node or a second node and send an RRC connection recovery message to a third node; and
a processor, connected to the transceiver and configured to determine whether downlink data from a master node (MN) side arrives or downlink data from a secondary node (SN) side arrives based on first information included in the paging message;

wherein the RRC connection recovery message includes second information and the second information is configured for the third node to determine whether the third node is an MN or an SN to correspondingly execute a key and a signaling radio bearer (SRB) recovery process on the MN side or execute a key and a SRB recovery process on the SN side.

11. The communication device of claim 10, wherein the transceiver is further configured to:
receive an RRC connection release message from the first node,
wherein the RRC connection release message includes a first terminal identifier allocated to a terminal by the first node and a second terminal identifier allocated to the terminal by the second node,
the first terminal identifier is configured to indicate that the first node is an MN and the second terminal identifier is configured to indicate that the second node is an SN.

12. The communication device of claim 11, wherein
in response to the transceiver receiving the paging message triggered by the first node and the paging message including the first terminal identifier, the processor is configured to determine that the downlink data from the MN side arrives based on the first terminal identifier; and
in response to the transceiver receiving the paging message triggered by the second node and the paging message including the second terminal identifier, the processor is configured to determine that the downlink data from the SN side arrives based on the second terminal identifier.

13. The communication device of claim 11, wherein
in a case that the downlink data from the MN side arrives, the second information in the RRC connection recovery message is the first terminal identifier; and
in a case that the downlink data from the SN side arrives, the second information in the RRC connection recovery message is the second terminal identifier.

14. The communication device of claim 10, further comprising:
a third receiving unit, configured to receive a connection release message from the first node, the RRC connection release message including a first terminal identifier allocated to the terminal by the first node.

15. The communication device of claim 14, wherein
in response to the first receiving unit receiving the paging message triggered by the first node and the paging message including first indication information, the determination unit is configured to determine that the downlink data from the MN side arrives based on the first indication information; and
in response to the first receiving unit receiving the paging message triggered by the second node and the paging message including second indication information, the determination unit is configured to determine that the downlink data from the SN side arrives based on the second indication information.

16. The communication device of claim 14, wherein
in a case that the downlink data from the MN side arrives, the second information in the RRC connection recovery message is third indication information and the third indication information is configured to indicate that the third node is an MN; and
in a case that the downlink data from the SN side arrives, the second information in the RRC connection recovery message is fourth indication information and the fourth indication information is configured to indicate that the third node is an SN.

17. The communication device of claim 16, further comprising the generation unit, wherein
in response to the downlink data from the MN side arriving, the generation unit is configured to generate first security information by use of the key on the MN side or a key derived based on the key on the MN side, and the sending unit is configured to include the first security information into the RRC connection recovery message to send the first security information to the third node; and
in response to the downlink data from the SN side arriving, the generation unit is configured to generate second security information based on the key on the SN side or a key derived based on the key on the SN side, and the sending unit is configured to include the second security information into the RRC connection recovery message to send the second security information to the third node.

18. The communication device of claim 17, wherein
in a case that the RRC connection recovery message includes the first terminal identifier, the third indication information and the first security information, the information included in the RRC connection recovery message is used for the third node to, after receiving the RRC connection recovery message, perform addressing for the first node based on the first terminal identifier and send the third indication information and the first security information to the first node to enable the first node to determine based on the third indication information that the first node is required to perform security authentication on the first security information, and the third node recovers the key and SRB on the MN side after the security authentication succeeds; and
in a case that the RRC connection recovery message includes the first terminal identifier, the fourth indication information and the second security information, the information included in the RRC connection recovery message is used for the third node to, after receiving the RRC connection recovery message, perform addressing for the first node based on the first terminal identifier and send the fourth indication information and the second security information to the first node to enable the first node to determine based on the fourth indication information that the second security information is required to be forwarded to the second node for security authentication and the third node recovers the key and SRB on the SN side after the security authentication succeeds.

19. A chip, comprising a processor, configured to call and run a computer program in a memory to enable a device installed with the chip to implement the method according to claim 1.

20. A non-transitory computer-readable storage medium, configured to store a computer program, the computer program causing a computer to implement the method according to claim 1.

* * * * *